United States Patent Office 3,625,736
Patented Dec. 7, 1971

3,625,736
PRESSURE-SENSITIVE COPYING UNIT CONTAINING GRANULAR RESINOUS MATERIAL AND METHOD OF MAKING
Hiroharu Matsukawa, Shizuoka, and Keitaro Ohe, Daijiro Nishio, and Nobuo Tsuji, Kanagawa, Japan, assignors to Fuji Photo Film Co., Ltd., Kanagawa, Japan
No Drawing. Filed Oct. 28, 1968, Ser. No. 771,366
Claims priority, application Japan, Oct. 27, 1967, 42/69,045
Int. Cl. B41m 5/22
U.S. Cl. 117—36.2
17 Claims

ABSTRACT OF THE DISCLOSURE

A process for reinforcing microcapsules used in pressure sensitive copying papers which comprises incorporating a granular resinous polymer in a coating liquid containing the microcapsules and coating the liquid on a paper support to prepare a pressure sensitive copying paper. The microcapsules contain an adsorbable colorless organic compound which forms a color dyeing contact with an electron receptive adsorbent material. Specific resinous materials are defined in the specification. A pressure sensitive copying paper and a pressure sensitive copying unit utilizing the above materials is also described.

BACKGROUND OF THE INVENTION

Field of the invention

This invention relates to a process for the reinforcement of microcapsules useful for pressure sensitive copying papers with improved physical properties. More particularly, it is concerned with a process for improving the physical properties of microcapsules using a granular resin.

Description of the prior art

"Pressure sensitive copying paper," wherein a surface of a colorless paper develops color at its portions where local pressure is applied, is an application of color reactions between an electron-donating, adsorbable, color-forming, colorless organic compound and an electron-receptive, adsorbent material through the medium of a non-polar, oily solvent.

Each particle of the adsorbable, color-forming, colorless organic compound, such as leuco methylene blue or crystal violet lactone, (hereinafter referred to as a "color former") is covered with a protective coating film of a natural or synthetic high-molecular material to form a non-volatile microcapsule. The microcapsules are applied to a surface of a base paper. On the other hand, the electron-receptive, adsorbent material, such as attapulgite or montmorillonite, is applied with a natural or synthetic binder, such as casein or a styrene-butadiene latex, to a surface of another base paper. When two or more sheets of the copying paper thus formed are arranged in a manner so that the surface coated with the microcapsule is in contact with the surface coated with the absorbent material, and the unit is subjected to local pressure by handwriting or by typewriting, the locally pressed areas of the paper develop color. This is disclosed in U.S. Patents 2,712,507, 2,730,456 and 2,730,457, which are broadly representative of the prior art.

As another embodiment of a pressure sensitive copying paper, there is also employed a paper which is coated with clay and capsules containing the color former on the same surface.

There have been proposed, with respect to the preparation of the oil-containing, pressure-rupturable microcapsules, coacervation methods, such as disclosed in U.S. Patents 2,800,457 and 2,800,458; and polymerization methods using monomers or initial condensates of synthetic resins, as disclosed in Japanese patent specification Nos. 19,574/63, 446/67, 771/67, 2882/67, 2883/67, 8673/67, 21,128/67, and in British Patent Nos. 950,443 and 1,046,409. However, the microcapsules prepared in these methods were unsatisfactory in their pressure-resisting property, abrasion resisting property, shock resisting property and other physical properties, so that it was necessary to solve the problem of the development of "fog" color during the winding up of a coated base paper after application of the active components thereto, during cutting of the coated base paper, or during printing or copying.

SUMMARY OF THE INVENTION

The present invention involves a process for reinforcing microcapsules which are used in pressure sensitive copying papers. These microcapsules typically contain an adsorbable colorless organic compound which is capable of forming a color dye upon contact with an electron receptive adsorbent material. The electron receptive adsorbent material is typically utilized as a dispersion in a water-immiscible oil. The granular resinous polymer is incorporated into a coating liquid containing the microcapsules, and the coating liquid is coated onto a paper support, thereby yielding the pressure sensitive copying paper. Typically, the diameter of the microcapsules is from about 5 to about 80 microns, and the amount of the polymer is from about ¼ to about ⅓ (by weight) of the solids content of a liquid containing the microcapsules. Coacervation and polymerization methods may be used to form the microcapsules.

The reinforced microcapsules find special use in either one sheet copying papers wherein both reactants are present in the sheet, or else in copying paper composites, wherein the microcapsules are carried on one sheet and the electron receptive material is carried on a separate sheet.

Therefore, an object of the present invention is to improve the properties desired for pressure-sensitive copying papers, such as pressure resistance and abrasion resistance.

Another object of this invention is to provide a pressure-sensitive copying paper which retains an equal or superior color forming property on typewriting, stamping or handwriting when compared with copying papers, while illustrating little tendency to fog during winding-up, handling and printing or copying procedures, by incorporating and dispersing a fine-granular resin into a liquid containing microcapsules, before applying the liquid to a paper support.

DESCRIPTION OF THE PREFERRED EMBODIMENTS

The pressure-sensitive copying paper of the present invention possesses an ideal combination of properties, namely, a high sensitivity and a low fog. This is contrary to the usual pressure sensitive copying paper wherein the fog increases with an increase of the color forming efficiency.

As the fine granular resinous material used in the present invention, there may be used water insoluble or weakly soluble polymers and copolymers of various vinyl or diene compounds, such as methacrylonitrile, acrylonitrile, methacrylic acid esters, acrylic acid esters, styrene, dienes, vinyl esters, vinyl ethers, olefins and vinyl chloride, in the form of fine spherical particles or granules, desirably in the form of fine spherical particles. Examples of the vinyl or diene compound monomers used in the present invention are: acrylonitrile, methacrylonitrile, methyl methacrylate, ethyl methacrylate, propyl methacrylate, butyl methacrylates, amyl methacrylate, octyl methacrylate, methyl acrylate, ethyl acrylate, propyl acrylate, butyl acrylate, amyl acrylate, octyl acrylate, styrene α-methylstyrene, butadiene, isoprene, chloroprene, vinyl acetate, vinyl propionate, vinyl butylate, ethyl vinyl ether, propyl vinyl ether, butyl vinyl ether, ethylene, propylene, butene-1, isobutene, vinyl chloride, vinylidene chloride and the like. As hereinafter set forth, these monomers may be used in mixtures of two or more to form a copolymer, as well as single monomers to form a homopolymer.

The fine particles of such a polymer or copolymer may be prepared by polymerizing a monomer or mixture of monomers in suspension the monomer or mixture of monomers being polymerized in an aqueous dispersion by a mixing apparatus using a suitable dispersing agent. For example, the particles can be formed by stably dispersing a solution in an organic solvent of such a polymer, copolymer, or mixture thereof, in water using a mixing apparatus and a dispersing agent and then heating, with stirring, the resulting dispersion to eliminate (by evaporation) the organic solvent. Alternatively, by mechanically pulverizing the polymer or copolymer in a finely divided state the particles can be formed.

The finely divided polymerizate thus obtained is recovered from the reaction medium by filtration and drying and the resulting dry powdered polymer is added to the microcapsule liquid. Alternately, the finely divided polymerizate in dispersion in the aqueous medium may be directly added to the microcapsule liquid.

On addition of the granular polymerizate obtained by such a method to a microcapsule liquid, it is necessary to obtain an optimum result, to properly select the amount added, the particle size, hardness and other physical properties of the granular polymerizate with respect to the physical properties of the capsule.

The proper particle size of the polymerizate is about 1.5 times that of the particles of the microcapsule. If the particle size of the former is more than 2 times that of the latter particle, spots will be observed upon pressure testing, and, if the size of the former particles exceeds 50 microns, a rough surfaced coating layer will be formed. On the other hand, a granular polymerizate with a particle size less than that of the microcapsule particle has little effect, especially on the abrasion resistance, so that it must be incorporated in increased amounts to obtain a sufficient effect. Therefore, a 5 to 80 micron particle size is desirable and, especially a 10 to 30 micron size is preferred.

The necessary hardness for the polymerizate corresponds to a polymer with a glass-transition point of −80° C. to 120° C. and a softening point of 50° C. to 200° C., preferably of 70° C. to 150° C. Accordingly, although a homopolymer may be suitably used, a copolymer derived from an appropriate combination of monomers is preferred.

The amount of the granular polymer added is at least ⅕, preferably ¼ to ⅓ that of the solids content of a coating liquid containing the microcapsules.

It has previously been proposed, for the prevention of stains on contact between the microcapsule-bearing surface and the clay bearing surface of pressure sensitive copying paper, especially on abrasive contact, to use a cellulosic flock. In the practice of the present invention cellulose flock may also be used in combination with the granular polymer. In cases where a hard granular resin is used, it is preferred to use a cellulose flock in combination with a resin with a softening point of at least 120° C., to obtain a synergistic effect.

Pressure-sensitive copying paper prepared using a granular resin in accordance with the present invention has, compared with prior art pressure sensitive copying papers, improved properties as follows:

While in pressure sensitive copying papers in the form of a chit or account book, it was difficult to turn over one sheet at a time, i.e. usually there would be turned over piles of two or three sheets, the pressure sensitive copying paper of the present invention is free from such defects, due to the decreased frictional coefficient brought about by the addition of the resinous material in the form of spherical particles. In cases of pressure sensitive copying papers for multiple copy of 16 sheets or more, there is a demand for high resolving power or clear-cut copied characters in sheets beyond the tenth, and the pressure sensitive copying paper in accordance with the present invention brings about an improvement in the resolving power in multiple copying because lines of character develop color sharply and deeply, due to freedom from dissipation of pressure in the pressurized areas.

The pressure-sensitive copying paper of the present invention is characterized by the use of a granular resinous polymer. The quality of the pressure-sensitive paper is not influenced by the kinds of color former or the method of preparing the microcapsules. Thus, the process of the present invention is not restricted by the method of preparing the pressure sensitive copying paper and is applicable to any of the prior methods of preparing pressure sensitive copying papers, without any necessity for changing raw materials, and may be formed with the prior art apparatus used for the preparation of coating liquid, i.e., for the coating and drying of the coating liquid.

The present invention will now be illustrated in detail by the following examples, which are not limitative.

The preparation of microcapsules by the coacervation method:

Example 1.—2.5 parts by weight (all the parts, hereinafter, are by weight) of Crystal Violet Lactone and 2.0 parts of Benzoyl Leuco Methylene Blue were dissolved, with heating at 80–90° C., in 100 parts of a 4:1 mixture of chlorinated diphenyl and kerosene to form a color former oil (the color former oil being referred to hereinafter as C-Oil.).

10 parts of an acid-treated gelatin derived from pig skin and adjusted to a pH of 8.0 and 10 parts of gum arabic were dissolved in 50 parts of warm water at 40° C. To the resulting solution there was added 0.5 part of Turkey red oil as an emulsifier, and there was dispersed therein 70 parts of the C-Oil mentioned above, with stirring. The stirring was stopped when the size of the oil particles reached a maximum of 6 microns, and the emulsion was then diluted by adding thereto warm water at 40° C. to a total weight of 900 parts. To the emulsion there was then added, with stirring, a 10% aqueous succinic acid solution to adjust the solution to a pH of 4.0. By this technique, colloidal gelatin was deposited on the surfaces of the oil particles and microcapsules were formed. The stirring was continued while maintaining the liquid temperature at 45° C. and, after 20 minutes, the reaction vessel was cooled from the outside with ice water to set and gel the walls of the microcapsules. To the dispersion of microcapsules thus formed and maintained at 15° C., there was added a 37% formalin solution (10 parts) to cure the walls of the microcapsules. When further curing was desired, the softening point was raised by adding a 15% aqueous caustic soda solution to adjust the pH thereof to 9–10 at a liquid temperature of 10° C. The liquid was then heated for 20 minutes to a temperature of 50° C. The microcapsules thus formed had an average particle size of 10 microns.

The microcapsules liquid thus was formed and was suitably adjusted to a solids content of 20%. To 100 parts of the microcapsule liquid there was added, and thoroughly dispersed, 5.0 parts (in a dry state of a dispersion of a 4:2:4 copolymer of methyl acrylate:styrene:vinylacetate with an average particle size of 15 microns (maximum particle size of 20 microns). The liquid was applied at a rate of 6.0 g. per square meter to a surface of a base paper in an air knife coating process. The liquid exhibited a good coating quality. The coated paper thus obtained exhibited little breakage of microcapsules under a pressure of 40 kg./cm.² and, consequently, did not greatly stain the surface of a base paper coated with a clay upon contact between the surface coated with the microcapsules and the surface coated with the clay during winding-up, handling and cutting or slitting of the two papers.

The thus coated paper stood an abrasion test in which the surface of the paper coated with the microcapsules was brought into contact with the surface of a paper coated with the clay. Moreover, when the coated paper was piled up, it was possible to very smoothly turn over one sheet at a time without any difficulty, and the clear cut of the developed characters was enchanced, in case of multiple copies, 1.5 times that of a copying paper prepared using cellulose flock.

Example 2.—To 100 parts of a liquid containing microcapsules which had been prepared by the coacervation method of Example 1, there was added 10 parts of an aqueous dispersion of an 8:2 copolymer of ethyl methacrylate and styrene having an average particle size of 20 microns (maximum particle size of 25 microns) and a solids content of 40%. The procedure of Example 1 was then repeated. The resulting coated paper exhibited the expected properties and gave good results with the abrasion test.

Example 3.—The coacervation method of preparing microcapsules of Example 1 was repeated except that the maximum size of the oil particles was 10 microns, the amount of water was reduced to make the total amount of the system equal to 700 parts, and the 10% succinic acid solution was replaced by a 50% acetic acid solution. The sizes of the resulting microcapsules were, at most, 15 microns. The resulting microcapsule liquid was adjusted, by decantation, to a concentration of 20%. To 100 parts of the microcapsule liquid there was added 20 parts of a 5:2:3 copolymer of butyl methacrylate:methyl methacrylate: styrene in the form of an aqueous dispersion with a 40% solids content and of an average particle size of 20 microns (maximum particle size of 25 microns). This was coated on a paper to a standard thickness, and the resulting coated paper exhibited superiority in its pressure resisting property, abrasion resisting property, resolving power, easiness of turn-over, and its other properties.

Example 4.—The procedure of Example 3 was followed, except that there was used a dispersion copolymer which had a monomer composition of methyl methacrylate:isobutyl methacrylate (2.8 ratio with an average particle size of 25 microns (maximum particle size of 30 microns). The final product exhibited superior properties.

Example 5.—Example 1 was repeated except that there was added to the capsule liquid of Example 1, 1.0 part of a cellulose powder, KC flock W-200 (manufactured by Kokusaku Pulp Industry Co., Ltd.). The resulting coated paper illustrated an excellent abrasion resistance.

The preparation of microcapsules by the polymerization method.

Example 6.—100 parts of gum arabic, 5 parts of Turkey red oil and 500 parts of water were mixed together, with stirring, to form a solution. 100 parts of the C-Oil in Example 1 was added with 20 parts of an unsaturated polyester resin and, after heating to form a solution, the resulting solution was added dropwise to the gum arabic-Turkey red oil-water system described above, with stirring, to emulsify into oil particles of an average particle size of 2 microns. While maintaining the temperature of the emulsion at 70° C. there was added, with stirring, 10 parts of a 10% potassium persulfate solution, and the stirring was continued for 2 hours to effect formation of a polymeric skin on the surface of the oil particle and, thereby, to attain microcapsules of the same size with the oil particles.

85 parts of poly(methyl methacrylate) of a polymerization degree of 1,000 in 35% solution in methylene chloride was gradually added, with stirring, to an aqueous solution consisting of 100 parts of water, 7 parts of gelatin and 0.4 part of sodium nonylbenzenesulfonate. After completion of the dropwise addition of the solution, the liquid was maintained at a temperature of 70° C. to evaporate solvent. Thus, there was obtained a granular resin with an average particle size of 5 microns. 10 parts of the spherical resin as added to, and thoroughly dispersed, in 50 parts of the microcapsule liquid and the resulting liquid was applied at a rate of 7 g./cm.² onto a surface of a base paper. The resulting coated paper exhibited an excellent pressure resisting property, abrasion resisting property and other properties.

Example 8.—Example 7 was repeated except that there was used, for the preparation of the granular resin, a copolymer of methyl methacrylate and butyl methacrylate (monomer proportions of 4:1).

What is claimed is:

1. A process for the reinforcement of microcapsules for use in pressure-sensitive copying papers, said microcapsules containing an adsorbable colorless organic compound capable of forming a color dye in contact with an electron receptive adsorbent material as a dispersion in a water-immiscible oil, which comprises
incorporating into a coating liquid containing the microcapsules a granular resinous polymer having a glass-transition point of from −80° C. to 120° C. and a particle size of from equal to to twice as large as the particle size of the microcapsule in an amount of at least ⅓ by weight based on the solid content of the coating liquid, and
coating the liquid on a paper support to prepare a pressure-sensitive copying paper.

2. The process for the reinforcement of microcapsules for use in pressure sensitive copying papers as claimed in claim 1 wherein said granular resinous polymer is selected from the group consisting of homopolymers and copolymers of vinyl monomers which are at most slightly water soluble.

3. The process of claim 2 wherein said vinyl monomers are water insoluble.

4. The process for the reinforcement of microcapsules for pressure sensitive copying papers as claimed in claim 2 wherein said monomer is selected from the group consisting of acrylonitrile, methacrylonitrile, methyl methacrylate, ethyl methacrylate, propyl methacrylate, butyl methacrylate, amyl methacrylate, octyl methacrylate, methyl acrylate, ethyl acrylate, propyl acrylate, butylacrylate, amylacrylate, octyl acrylate, styrene, α-methylstyrene, vinyl acetate, vinyl propionate, vinyl butylate, ethyl vinyl ether, propyl vinyl ether, butyl vinyl ether, vinyl chloride and vinylidene chloride.

5. The process for the reinforcement of microcapsules for pressure sensitive copying papers as claimed in claim 1 wherein said granular resinous polymer is selected from the group consisting of homopolymers and copolymers of diene monomers which are at most slightly water soluble.

6. The process of claim 5 wherein said diene monomers are water insoluble.

7. The process for the reinforcement of microcapsules for pressure sensitive copying papers as claimed in claim 5 wherein said monomer is selected from the group consisting of butadiene, isoprene and chloroprene.

8. The process for the reinforcement of microcapsules for pressure sensitive copying papers as claimed in claim 1 wherein said granular resinous polymer is selected from the group consisting of homopolymers and copolymers of olefin monomers, which are at most slightly water soluble.

9. The process of claim 8 wherein said microcapsules are water insoluble.

10. The process for the reinforcement of microcapsules for pressure sensitive copying paper as claimed in claim 8 wherein said granular resinous polymer is selected from the group consisting of ethylene, propylene, butene-1, and isobutylene.

11. The process for the reinforcement of microcapsules for pressure sensitive copying papers as claimed in claim 1 wherein the diameter of said microcapsule is from about 5 to about 80 microns.

12. The process for the reinforcement of microcapsules for pressure sensitive copying paper as claimed in claim 1 wherein the amount of said polymer is from about ¼ to about ⅓ by weight based on the solids content of the microcapsules.

13. The process for the reinforcement of microcapsules for pressure sensitive copying paper as claimed in claim 1 wherein said polymer has a softening point of from about 50° to about 200° C.

14. The process for the reinforcement of microcapsules for pressure sensitive copying papers as claimed in claim 1 wherein said liquid containing the microcapsules is produced by a coacervation method.

15. The process for the reinforcement of microcapsules for pressure sensitive copying papers as claimed in claim 1 wherein said liquid containing the microcapsules is produced by a polymerization method.

16. A pressure sensitive copying unit which comprises a base paper having coated thereon a granular resinous polymer and microcapsules, said granular resinous polymer having a glass-transition point of from −80° C. to 120° C. and a particle size of from equal to to twice as large as the particle size of the microcapsules, said microcapsules containing an adsorbable, colorless organic compound capable of forming a color dye in contact with an electron-receptive adsorbent material as a dispersion in a water-immiscible oil, and a base paper having coated thereon the electron-receptive adsorbent material and a binder.

17. A pressure sensitive copying paper comprising a base paper having coated thereon microcapsules containing an adsorbable, colorless organic compound capable of forming a color dye in contact with an electron-receptive adsorbent material as a dispersion in a water-immiscible oil, a granular resinous polymer having a glass-transition point of from −80° C. to 120° C. and a particle size of from equal to to twice as large as the particle size of the microcapsules, a binder and the electron-receptive adsorbent material.

References Cited

UNITED STATES PATENTS

| | | | |
|---|---|---|---|
| 2,655,453 | 10/1953 | Sandberg | 117—36.1 |
| 2,711,375 | 6/1955 | Sandberg | 117—36.2 |
| 3,016,308 | 1/1962 | Macaulay | 117—36.1 |
| 3,481,759 | 12/1969 | Ostlie | 117—36.2 |

MURRAY KATZ, Primary Examiner

U.S. Cl. X.R.

117—36.8, 155